(12) United States Patent
Wotruba (10) Patent No.: US 9,327,359 B2
(45) Date of Patent: May 3, 2016

(54) TAP TOOL ASSEMBLY

(71) Applicant: Nissan North America, Inc., Franklin, TN (US)

(72) Inventor: Joel A. Wotruba, Smyrna, TN (US)

(73) Assignee: Nissan North America, Inc., Franklin, TN (US)

( * ) Notice: Subject to any disclaimer, the term of this patent is extended or adjusted under 35 U.S.C. 154(b) by 135 days.

(21) Appl. No.: 14/259,473

(22) Filed: Apr. 23, 2014

(65) Prior Publication Data

US 2015/0306689 A1    Oct. 29, 2015

(51) Int. Cl.
*B23G 1/18* (2006.01)
*B23G 5/06* (2006.01)

(52) U.S. Cl.
CPC ... *B23G 5/06* (2013.01); *B23G 1/18* (2013.01); *B23G 2240/48* (2013.01); *Y10T 408/5653* (2015.01); *Y10T 408/8925* (2015.01)

(58) Field of Classification Search
CPC ............ Y10T 408/559; Y10T 408/564; Y10T 408/5653; Y10T 408/57; Y10T 408/569; Y10T 408/8925; Y10T 408/98; B23G 1/26; B23G 1/28; B23G 1/44; B23G 1/46; B23G 1/48; B23G 7/02; B23G 2240/48; B23G 5/062; B23B 47/284
See application file for complete search history.

(56) References Cited

U.S. PATENT DOCUMENTS

| | | | | |
|---|---|---|---|---|
| 36,903 A | * | 11/1862 | Hadley | B23B 51/104 408/112 |
| 68,504 A | * | 9/1867 | Haworth | B23B 47/284 408/112 |
| 100,772 A | * | 3/1870 | Kelly | B23B 47/284 408/112 |
| 772,912 A | | 10/1904 | Allam | |
| 1,177,344 A | * | 3/1916 | Linderman | B23B 47/28 408/112 |
| 1,346,235 A | * | 7/1920 | Muller | B23G 1/48 408/112 |
| 2,338,765 A | * | 1/1944 | Hartman | B23B 49/00 408/112 |
| 2,576,786 A | * | 11/1951 | Gray | B23B 47/284 408/112 |
| 4,736,658 A | | 4/1988 | Jore | |
| 5,078,553 A | * | 1/1992 | Dutkiewicz | B23B 49/008 408/202 |
| 5,096,342 A | * | 3/1992 | Blankenship | B23B 49/008 408/112 |
| 6,511,268 B1 | | 1/2003 | Vasudeva et al. | |
| 6,668,941 B2 | | 12/2003 | Phillips et al. | |
| 7,107,882 B1 | | 9/2006 | Chang | |
| 7,210,881 B2 | * | 5/2007 | Greenberg | A61B 17/1615 408/110 |
| 2007/0041799 A1 | * | 2/2007 | Schaefer | B23G 7/02 408/97 |
| 2011/0188953 A1 | * | 8/2011 | Shafer | B23D 75/00 408/1 R |
| 2012/0079924 A1 | * | 4/2012 | Divine | B25G 1/043 81/489 |

FOREIGN PATENT DOCUMENTS

| | | | | |
|---|---|---|---|---|
| DE | 4000172 A1 | * | 7/1991 | ............ B09B 3/0058 |
| DE | 4123344 C1 | * | 6/1992 | ............... B23G 1/48 |
| DE | 29502537 U1 | * | 6/1996 | ............... B23G 1/48 |
| JP | 2002048138 A | * | 2/2002 | |

\* cited by examiner

*Primary Examiner* — Daniel Howell
(74) *Attorney, Agent, or Firm* — Global IP Counselors, LLP (57) ABSTRACT

A tap tool assembly includes a tap, a retaining member and a sleeve. The tap has a thread cutting section and a shaft section. The retaining member is fixed to the shaft section of the tap adjacent to a first end of the thread cutting section. The sleeve has a central bore extending therethrough. A surface of the sleeve defines the central bore and has a shoulder. The sleeve is coupled to the shaft section of the tap for movement between a first position completely covering the thread cutting section and a second position exposing at least a portion of the thread cutting section, with the sleeve being biased to move toward the first position.

19 Claims, 7 Drawing Sheets

TAP TOOL ASSEMBLY

BACKGROUND

1. Field of the Invention

The present invention generally relates to a tap tool assembly. More specifically, the present invention relates to tap tool assembly that cuts and/or cleans internal threads of a fastener and includes a sleeve biased to cover thread cleaning surfaces of the tap when the tap tool assembly is not in use.

2. Background Information

A vehicle body structure of a vehicle typically includes a plurality of fastener members welded or otherwise rigidly fixed to a body element of the vehicle body structure. During the manufacturing process, internal threads of the fastener members can be covered with powder coating, paint, or other materials that can interfere with attachment to mating fastener members. A thread cutting tap is typically used to clean the internal threads of the fastener members.

SUMMARY

One object of the disclosure is to provide a thread-cutting or thread cleaning tap with a cover or sleeve that protects the cutting teeth of the tap when not in use.

Another object of the disclosure is to provide a thread-cutting or thread cleaning tap with a cover or sleeve that covers the cutting surfaces of the tap to prevent the cutting surfaces from contacting materials present around a work area.

In view of the state of the known technology, one aspect of the disclosure includes a tap tool assembly having a tap, a retaining member and a sleeve. The tap has a thread cutting section and a shaft section. The retaining member is fixed to the shaft section of the tap adjacent to a first end of the thread cutting section. The sleeve has a central bore extending therethrough. A surface of the sleeve that defines the central bore has a shoulder. The sleeve is coupled to the shaft section of the tap for movement between a first position completely covering the thread cutting section and a second position exposing at least a portion of the thread cutting section, with the sleeve being biased to move toward the first position.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
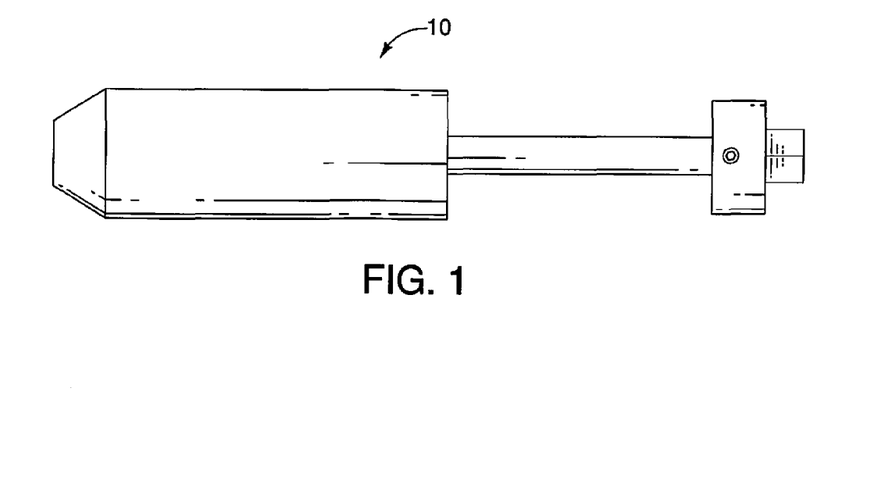
FIG. 1 is a side view of a tap tool assembly showing a portion of a tap and a retractable sleeve that covers thread cutting surfaces of the tap in accordance with one embodiment.
Figure 2:
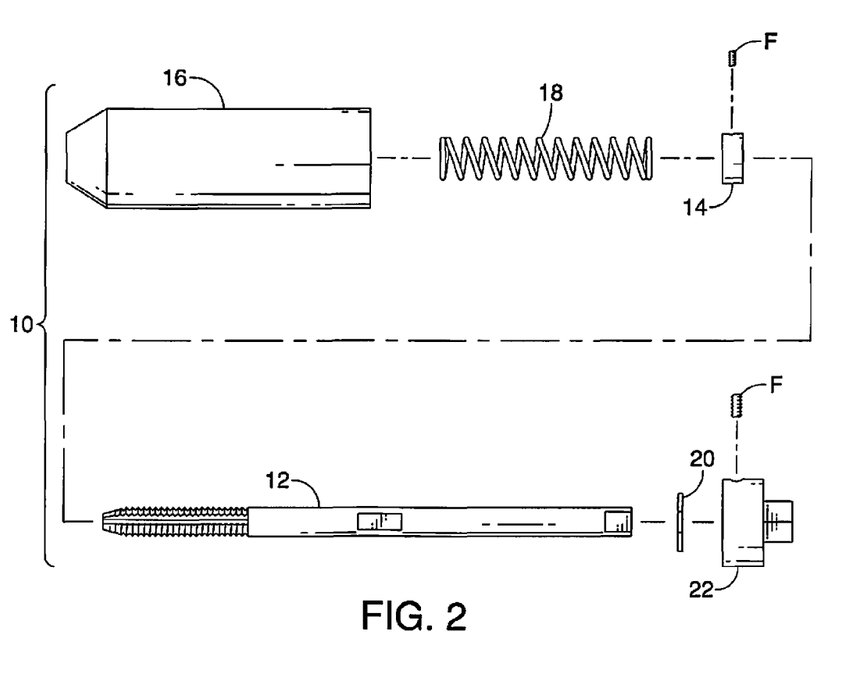
FIG. 2 is an exploded view of the tool assembly showing the tap, a retaining collar, the sleeve, a biasing spring, a retaining clip and an end cap in accordance with the one embodiment.

Referring initially to FIGS. 1 and 2, a tap tool assembly 10 is illustrated in accordance with a first embodiment. The tap tool assembly 10 is a tool that includes a tap 12 that is configured to cut thread in a bore or opening of a suitable fastener making material, such as a metal material. However, in the present disclosure, the tap 12 has been modified to create the tap tool assembly 10 and is configured to clean existing internal threads previously cut in a fastener, where the internal threads can include debris, such as paint or coating materials that can interfere with subsequent installation of a fastener having mating external threads that engage the internal threads.

As shown in FIG. 2, the tap tool assembly 10 basically includes a tap 12, a retaining member 14, a sleeve 16, a biasing spring 18, a retaining clip 20 and an end cap 22.

Figure 3:
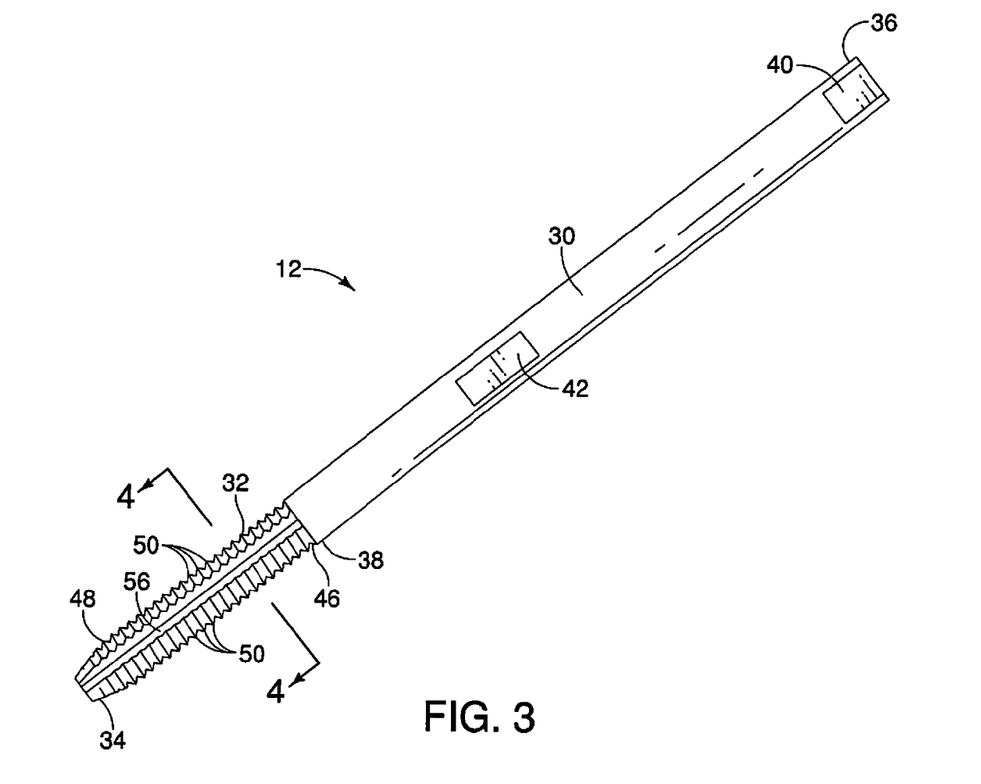
FIG. 3 is an enlarged view of the tap removed from the tap tool assembly, showing a shaft section, a thread cutting section and an alignment section in accordance with the one embodiment.

As shown in FIG. 3, the tap 12 is typically made of a hardened steel material that is engineered to be rigid and retain sharp thread cutting edges or surfaces. The tap 12 is an elongated shaft member. The tap 12 is machined, milled or otherwise formed to include a shaft section 30, a thread cutting section 32 and an alignment section 34. The shaft section 30, the thread cutting section 32 and the alignment section 34 are formed as a single, rigid, unitary, monolithic element with no breaks, cuts or separations between the sections.

The shaft section 30 has a first end 36 and a second end 38. The first end 36 includes at least one flat surface 40 that is provided for retention of the end cap 22, as described in greater detail below. The second end 38 of the shaft section 30 includes another flat surface 42 that is provided for retention of the retaining member 14, as is described in greater detail below.

Figure 4:
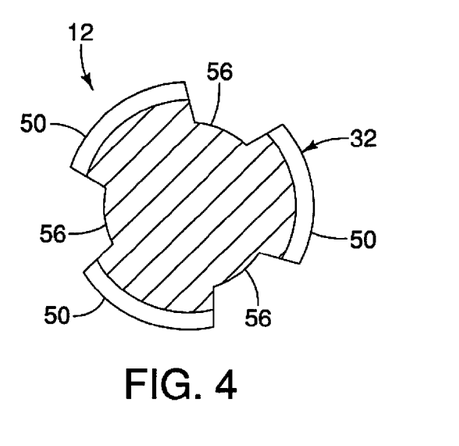
FIG. 4 is a cross-sectional view of the thread cutting section of the tap taken along the line 4-4 in FIG. 3, showing thread cutting surfaces and debris retaining recesses in accordance with the one embodiment.

The thread cutting section 32 has a first end 46 and a second end 48. The first end 46 is continuous with the second end 38 of the shaft section 30. The threaded cutting section 32 includes a plurality of cutting surfaces 50 that mate with internal machine threads of a fastener member 54 (FIGS. 13 and 14) that is described in greater detail below. The cutting surfaces 50 are segmented by debris retaining recesses 56 that extend the length of the thread cutting section 32. As shown in FIG. 4, the thread cutting section 32 includes three of the debris retaining recesses 56. However, it should be understood from the drawings and the description herein that the thread cutting section 32 can include a differing number of the debris retaining recesses 56. For example, the cutting surfaces 50 of the thread cutting section 32 can be segmented by two or four of the debris retaining recesses 56, as needed or desired. In the depicted embodiment, the second end 48 of the thread cutting section 32 is shown with a linear profile, as seen from the side in FIG. 3. However, the second end 48 can be slightly tapered with a gradually diminishing outer diameter toward the alignment section 34, as needed and desired. Typically, a thread cutting tap includes a gradually tapering end. However, in the depicted embodiment, since the tap tool assembly 10 is intended mainly for cleaning existing internal threads, it is not necessary for the thread cutting section 32 to have a tapering profile.

The alignment section 34 is a tapering end of the tap 12 that can include cutting surfaces, or alternatively be smooth with no cutting surfaces in order to align the tap 12 with an existing threaded bore. Specifically, the alignment section 34 is for aligning the tap 12 with an aperture in the fastener member 54 such that the cutting surfaces 50 more readily align and mate with threads formed in the fastener member 54 such that the thread cutting section 32 can clean debris, coatings and paint from the internal threads of the fastener member 54, as described in greater detail below.

As shown in FIG. 3, the alignment section 34 has a tapering diameter moving away from the thread cutting section 32. Further, at its largest area, the outer diameter of the alignment section 34 is smaller than an outermost diameter of the thread cutting section 32.

Figure 5:
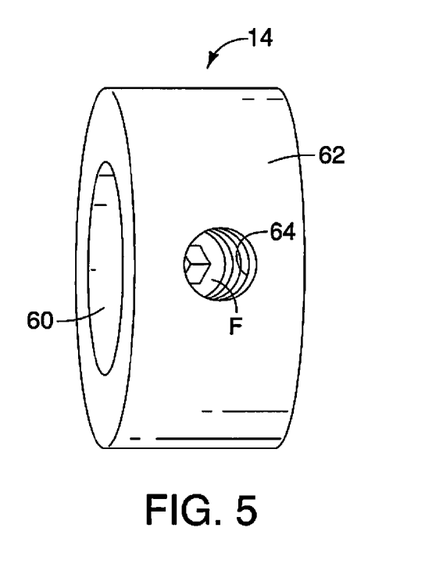
FIG. 5 is a perspective view of the retaining collar in accordance with the one embodiment.

A description of the retaining member 14 is now provided with specific reference to FIGS. 2 and 5. The retaining member 14 is an annular shaped member that is made of metal or other rigid material such as a polymer or plastic material. However, in the depicted embodiment, the retaining member 14 is made of metal.

The retaining member 14 includes a central aperture 60 and a cylindrically shaped outer surface 62. The central aperture 60 has an inner diameter that is approximately equal to the outer diameter of the shaft section 30 of the tap 12, within a predetermined tolerance. Specifically, the central aperture 60 is dimensioned such that it can easily fit around the shaft section 30 of the tap 12 and slide over the flat surface 42 adjacent to the first end 46 of the thread cutting section 32. As shown in FIG. 5, a threaded aperture 64 is formed in the retaining member 14 that extends from the outer surface 62 to the central aperture 60. More specifically, the threaded aperture 64 is oriented perpendicular to a central axis defined by the central aperture 60.

Figure 8:
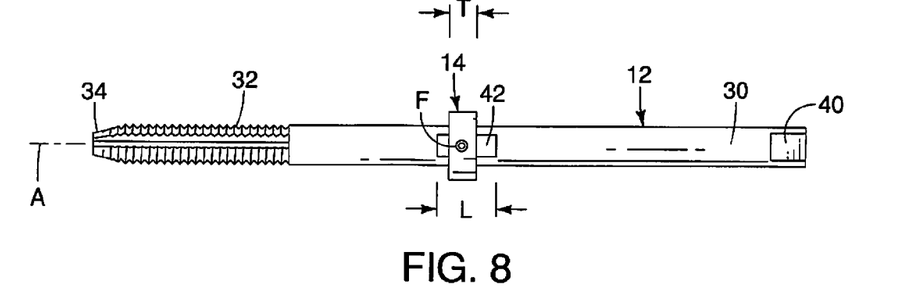
FIG. 8 is a side view of the tap showing the retaining collar installed to the tap in accordance with the one embodiment.
Figure 9:
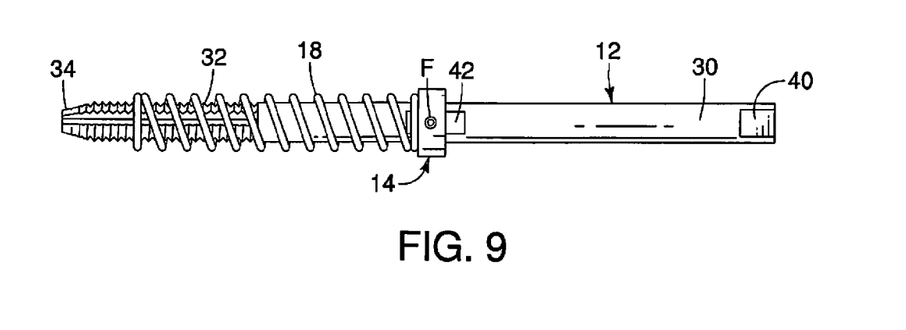
FIG. 9 is another side view of the tap showing the retaining collar and the biasing spring installed to the tap in accordance with the one embodiment.
Figure 10:
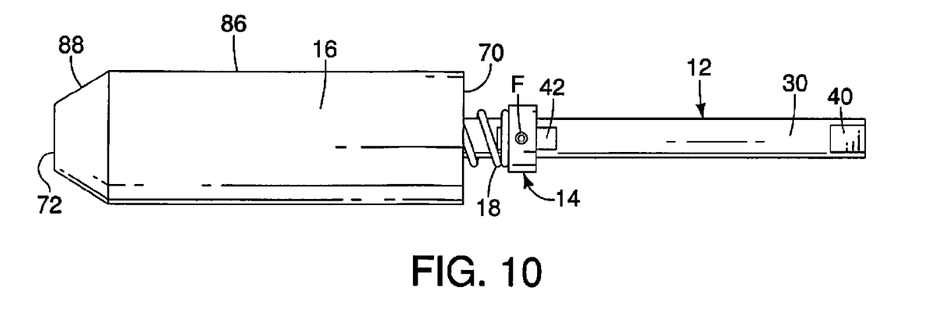
FIG. 10 is another side view of the tap showing the sleeve partially installed to the tap covering the thread cutting section of the tap and the biasing spring in accordance with the one embodiment.
Figure 13:
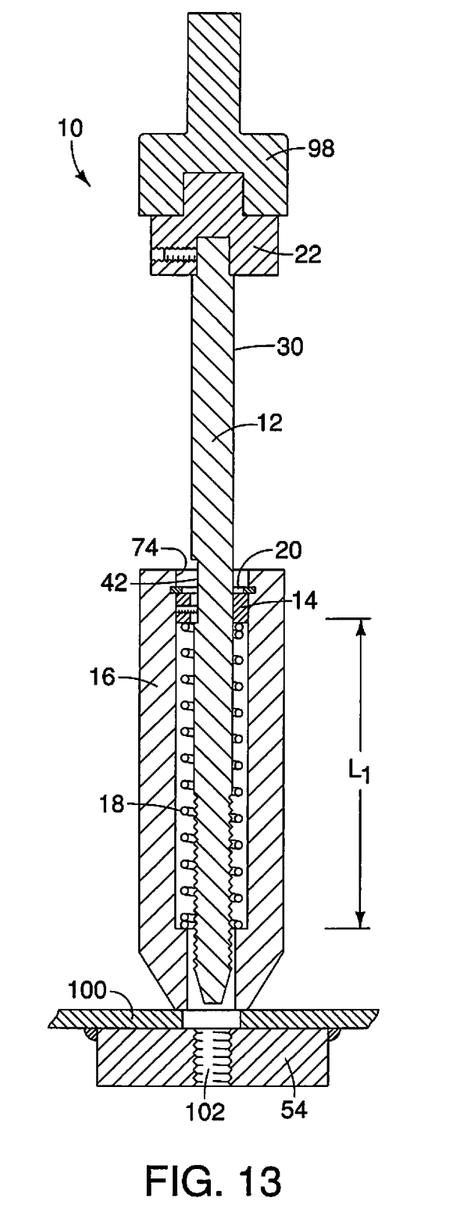
FIG. 13 is a side cross-sectional view of the tool tap assembly being positioned to clean internal threads of a fastener in accordance with the one embodiment.
Figure 15:
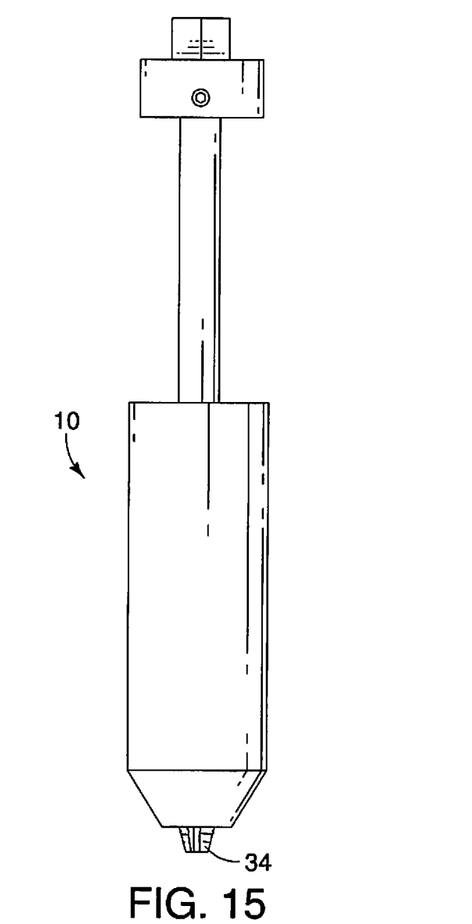
FIG. 15 is a side view of the tap tool assembly showing the portion of the tap and the retractable sleeve that covers thread cutting surfaces of the tap but adjusted to expose an alignment section of the tap in accordance with the one embodiment.
Figure 16:
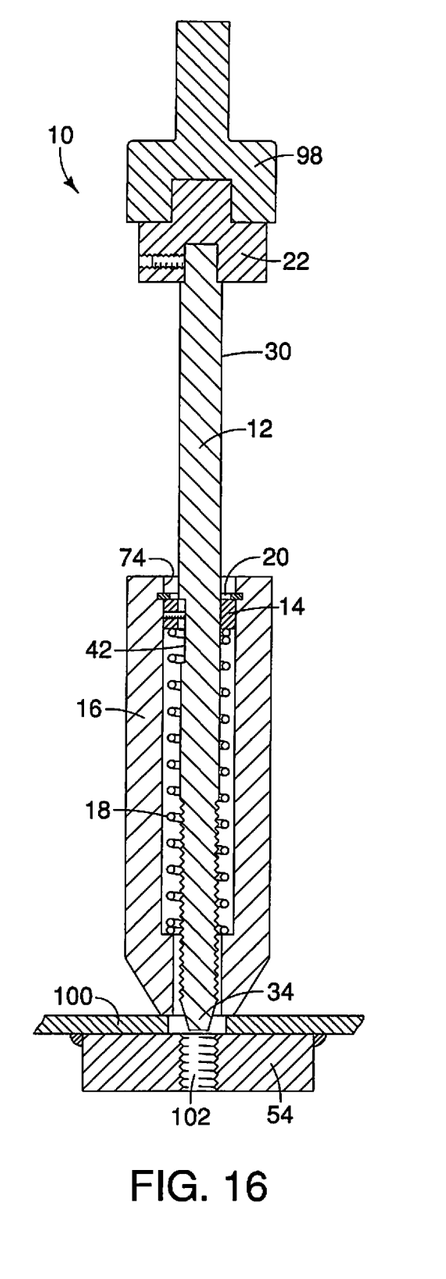
FIG. 16 is a side cross-sectional view of the tool tap assembly depicted in FIG. 15, showing the tool tap assembly positioned to clean internal threads of the fastener in accordance with the one embodiment.

As shown in FIG. 8, the retaining member 14 is installed on the tap 12 covering a portion of the flat surface 42. A fastener F installed in the threaded aperture 64 is tightened against the flat surface 42, fixing the retaining member 14 in position on the shaft portion 30 of the tap 12. As is shown in FIG. 8, the flat surface 42 has an overall length L measured in a lengthwise direction of the tap 12 corresponding to an axis A of the tap 12 (an axial direction of the tap 12). The retaining member 14 has a thickness T also measured in the lengthwise direction of the tap 12. The thickness T of the retaining member 14 is less than the overall length L of the flat surface 42. Hence, the retaining member 14 can be positioned and secured anywhere along the overall length L of the flat surface 42, providing a way to adjust and fine tune the position of the retaining member 14. The positioning of the retaining member 14 provides a way to adjust the final first position of the sleeve 16 relative to the tap 12. In the depicted embodiment, the alignment section 34 of the tap 12 is completely covered by the sleeve 16 with the retaining member 14 fixed in a forward position relative to the flat surface 42 and the sleeve 16 being in the first position, as shown in FIGS. 1 and 13. However, the retaining member 14 can be repositioned to a rearward position relative to the flat surface 42 of the tap 12 in order to achieve the positioning of the sleeve 16 in the first position, where the alignment section 34 extends out of the sleeve 16 as shown in FIGS. 15 and 16.

Figure 6:
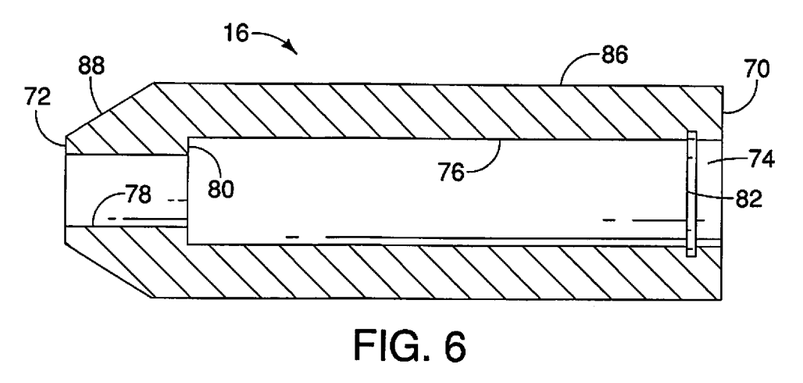
FIG. 6 is a cross-sectional side view of the sleeve showing first and second inner surfaces of a central bore and an annular shoulder extending between the first and second inner surfaces of a central bore in accordance with the one embodiment.

A description of the sleeve 16 is now provided with specific reference to FIG. 6. The sleeve 16 has an overall cylindrical shape and can be made of metal, plastic and/or polymer materials. The sleeve 16 has a first end 70 and a second end 72. The sleeve 16 also includes a central bore 74 that extends through the sleeve 16 from the first end 70 to the second end 72. The central bore 74 is defined by a first inner surface 76, a second inner surface 78 and a shoulder 80. The first inner surface 76 is cylindrically shaped having a first diameter and the second inner surface 78 has a second diameter that is smaller than the first diameter. The shoulder 80 is an annular surface that extends between the first inner surface 76 and the second inner surface 78. The first inner surface 76 includes an annular recess 82 that is dimensioned to receive the retaining clip 20, as is described in greater detail below.

Figure 14:
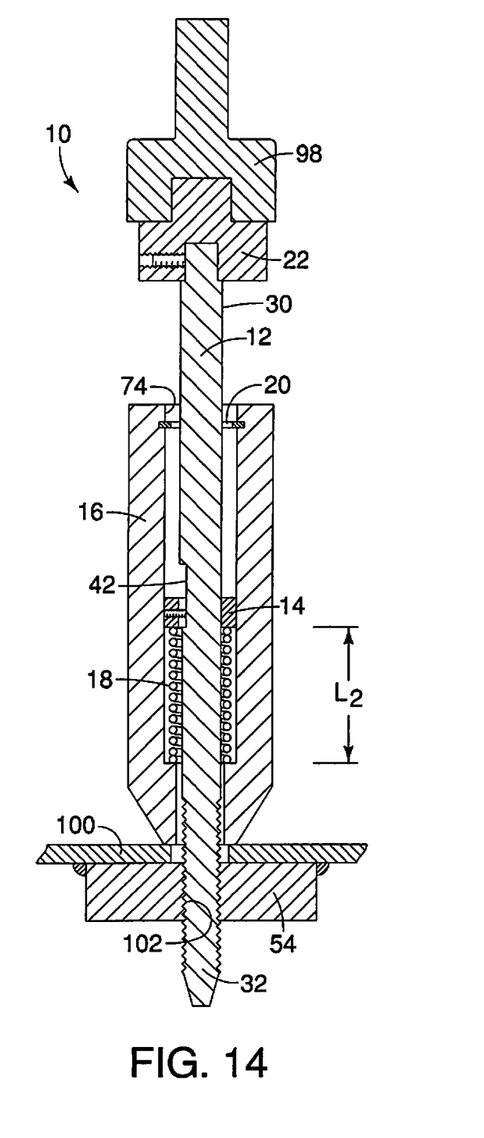
FIG. 14 is another side cross-sectional view of the tool tap assembly in use cleaning the internal threads of the fastener in accordance with the one embodiment.

As shown in FIGS. 13 and 14, the outer surface 62 of the retaining member 14 has an outer diameter that is slightly smaller than the internal diameter of the first inner surface 76 of the central bore 74 of the sleeve 16. Consequently, the sleeve 16 can freely slide along the outer surface 62 of the retaining member 14 between a first position of the sleeve 16 shown in FIG. 13 and a second position of the sleeve 16 shown in FIG. 14. However, the outer diameter of the retaining member 14 is larger than the internal diameter of the second inner surface 78 of the central bore 74 of the sleeve 16.

The sleeve 16 also includes a first outer surface section 86 and a second outer surface section 88. In the depicted embodiment, the first outer surface section 86 has a generally cylindrical shape. However, the second outer surface section 88 has a tapering diameter that gets smaller moving from the first outer surface section 86 to the second end 72 of the sleeve 16.

The biasing spring 18 is now described with specific reference to FIGS. 2, 9, 10, 13 and 14. In the depicted embodiment, the biasing spring 18 is a coil spring that is compressed in response to movement of the sleeve 16 when installed within the tap tool assembly 10.

As shown in FIGS. 9, 10, 13 and 14, the biasing spring 18 is installed over the thread cutting section 32 of the tap 12 with the tap 12 basically extending through a central opening defined by the coils of the biasing spring 18. With the biasing spring 18 installed, the sleeve 16 is thereafter coupled to the shaft section 30 of the tap 12 in a manner described further below. Once fully installed, the biasing spring 18 is confined between the retaining member 14 and the shoulder 80 of the central bore 74 within the sleeve 16. The biasing spring 18 biases the sleeve 16 toward the first position (FIG. 13). The biasing spring 18 is fully compressed with the sleeve 16 in the second position (FIG. 14).

When fully assembled, the sleeve 16 can undergo movement between the first position (FIG. 13) completely covering the thread cutting section 32 and the second position (FIG. 14) exposing at least a portion of the thread cutting section 32 and further compressing the biasing spring 18. With the sleeve 16 in the second position (FIG. 14) the thread cutting section 32 extends out of the central bore 74 at the second end 72 of the sleeve 16.

In the depicted embodiment as shown in FIG. 13, with the sleeve 16 in the first position, the thread cutting section 32 is completely covered. However, in an alternate embodiment, the first position of the sleeve 16 can be adjusted such that the alignment section 34 at least partially protrudes out of the central bore 74. With the sleeve 16 in the first position, at least a portion or all of the shaft section 30 of the tap 12 extends out of the central bore 74 at the first end 70 of the sleeve 16. With the sleeve 16 in the second position, the sleeve 16 covers a portion of the shaft section 30, as shown in FIG. 14.

With the sleeve 16 installed over both the biasing spring 18 and the thread cutting section 32 of the tap 12, as shown in FIG. 13, the biasing spring 18 is now located between the first inner surface 76 of the central bore 74 and the thread cutting section 32 of the tap 12. Further, in an axial direction of the tap 12, the biasing spring 18 is confined between the shoulder 80 within the central bore 74 of the sleeve 16 and an end surface of the retaining member 14. As shown in FIG. 13, the biasing spring 18 biases the sleeve 16 to the first position in which the sleeve 16 covers most or all of the thread cutting section 32 of the tap 12. The biasing spring 18 is in a compressed state between the shoulder 80 and the retaining member 14 such that with the sleeve 16 in the first position (shown in FIG. 13) the biasing spring 18 has a first overall length $L_1$ and with the sleeve 16 in the second position the biasing spring 18 has a second overall length $L_2$ that is less than the first overall length $L_1$.

Figure 11:
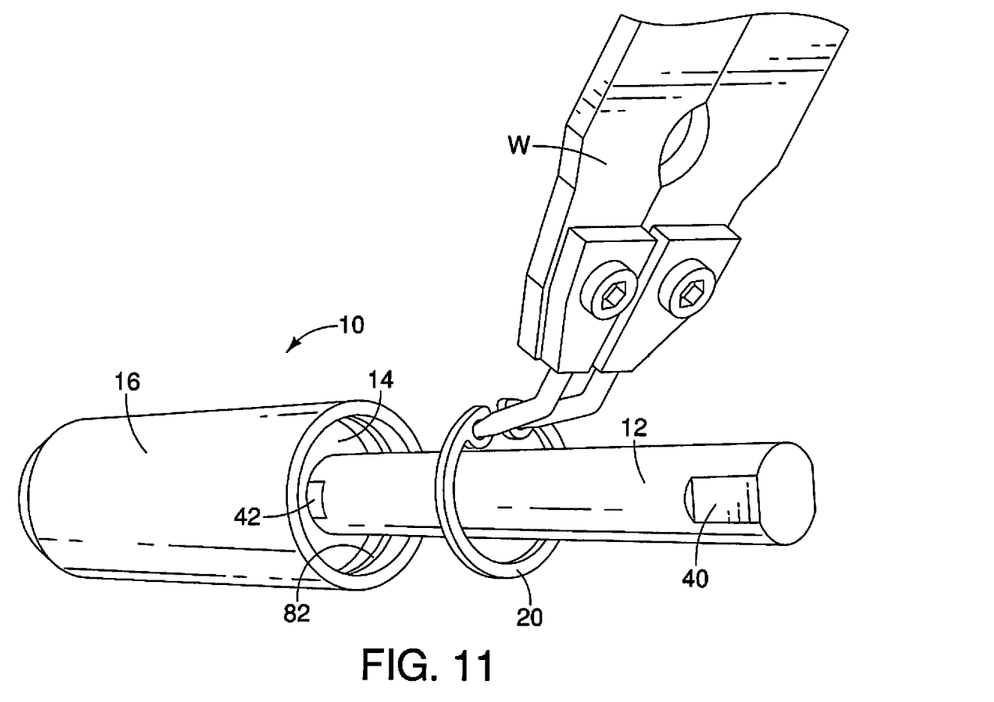
FIG. 11 is a perspective view of the tool tap assembly with the sleeve compressing biasing spring during installation of the retaining clip in accordance with the one embodiment.
Figure 12:
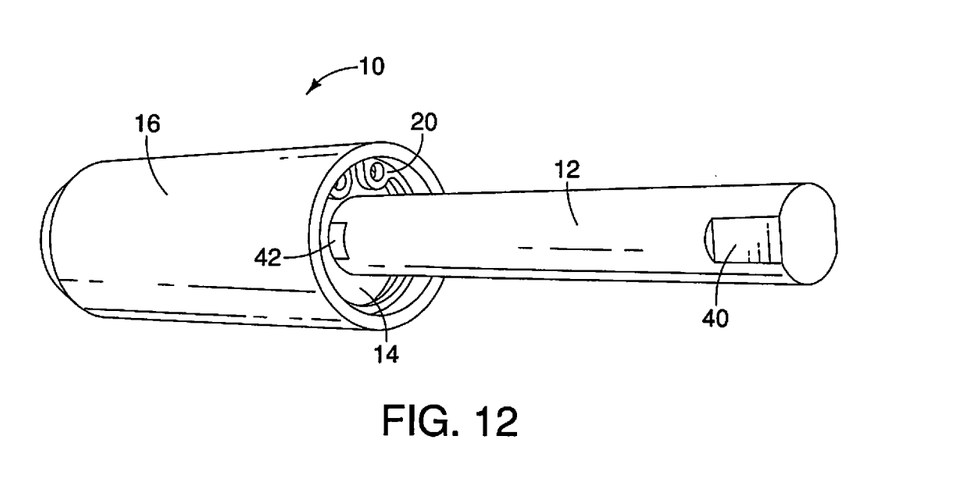
FIG. 12 is another perspective view of the tool tap assembly similar to FIG. 11, with the sleeve fully installed to the tap with the retaining clip fitted within a recess of the central bore of the sleeve in accordance with the one embodiment.

As shown in FIGS. 11 and 12, the retaining clip 20 is installed into the annular recess 82 of the central bore 74 of the sleeve 16. The annular recess 82 is a circumferentially extending channel formed in the first inner surface 76 of the central bore 74 dimensioned to receive the retaining clip 20. The retaining clip 20 is installed with a conventional wrench W. Once installed, the retaining clip 20 is positioned to limit movement of the sleeve 16 relative to the retaining member 14 with the sleeve 16 in the first position. Specifically, as shown in FIG. 13, the retaining clip 20 contacts the retaining member 14 with the sleeve 16 in the first position.

Figure 7:
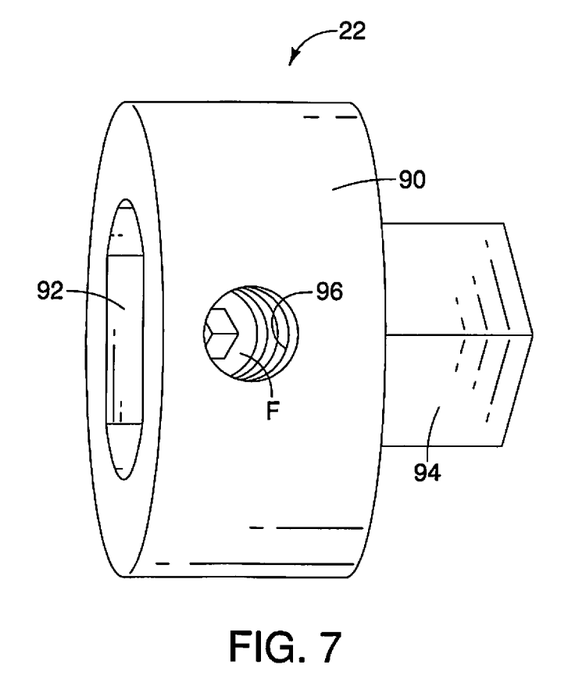
FIG. 7 is a perspective view of the end cap in accordance with the one embodiment.

As shown in FIGS. 2 and 7, the end cap 22 is an annular metal element or fitting that includes an annular outer surface 90, an opening 92, a tool receiving end 94 and a threaded aperture 96 that extends from the annular outer surface 90 to the opening 92. The threaded aperture 96 includes another fastener F that threadedly fits within the threaded aperture 96.

The end cap 22 is configured such that the first end 36 of the shaft section 30 extends into the opening 92 of the end cap 22 and non-rotatably fits into the opening 92. The fastener F is tightened to engage the flat surface 40 at the first end 36 thereby fixedly retaining the end cap 22 to the tap 12. Further, the opening 92 can be provided with a flat surface (or two flat surfaces) corresponding to the flat surface 40 (or optional flat surfaces 40) at the first end 36 of the tap 12. Hence, the end cap 22 is non-rotatably fixed to the first end 36 of the shaft section 30 of the tap 12.

The tool receiving end 94 has a hexagonal shape that is dimensioned to receive a standard socket wrench 98. Thus the tool receiving end 94 can be rotated either with a hand operated wrench or can alternatively be rotated using a power tool.

As mentioned above, the tap tool assembly 10 is preferably used for cleaning the internal threads of a fastener member 54. As shown in FIGS. 13 and 14, a vehicle body panel 100 includes one of the fastener members 54. The fastener member 54 is welded to the vehicle body panel 100 or otherwise rigidly fixed to the vehicle body panel 100. The fastener member 54 includes an aperture 102 that includes previously formed internal threads.

The tap tool assembly 10 is employed in the following manner. First the tap tool assembly 10 is positioned over the vehicle body panel 100 in close alignment with the apertures 102 as shown in FIG. 13. The technician operating the tap tool assembly 10 gently presses the sleeve 16 of the tap tool assembly 10 against the exposed surface of the vehicle body panel 100 in the area around the aperture 102. Pressing the sleeve 16 of the tap tool assembly 10 causes the biasing spring 18 to compress exposing the alignment section 34. Since the alignment section 34 is tapered, further pressing of the sleeve 16 against the vehicle body panel 100 causes the alignment section 34 to align the tap 12 with the aperture 102. Eventually, the cutting surfaces 50 contact the internal threads of the aperture 102. The operator then rotates the tap tool assembly 10, such that the cutting surfaces 50 engage the internal threads of the aperture 102, cleaning the internal threads, as shown in FIG. 14.

Once the internal threads of the aperture 102 have been cleaned, the tap tool assembly 10 is rotated in a reverse direction, removing the tap tool assembly 10 from the fastener 54, and the sleeve 16 is moved back to the first position (FIG. 13), covering and protecting the cutting surfaces 50 of the tap 12.

The sleeve 16 of the tap tool assembly 10 not only protects the cutting surfaces 50 of the tap tool assembly 10, the sleeve 16 also prevents materials in the work area around the fastener 54 from becoming tangled in the cutting surfaces 50. For example, the technician operating the tap tool assembly 10 can wear gloves. If a power tool (not shown) is used with a conventional tap (without the sleeve 16), rapid rotation of the conventional tap may cause fibers of the gloves to become caught and tangled up in the exposed cutting surfaces of the conventional tap. The sleeve 16 of the tap tool assembly 10 prevents such a circumstance.

As shown in FIGS. 15 and 16, the retaining member 14 of the tap tool assembly 10 is adjusted to a location on the flat surface 42 such that in the first position, the alignment section 34 of the tool tap assembly 10 extends out of the central bore 74 of the sleeve 16 with the tap 12. Since the alignment section 34 has reduced thread cutting surfaces, or no thread cutting surfaces at all, there no need for concern regarding contact between external objects and the alignment section 34. However, an advantage of the overall length L of the flat surface 42 and the re-positioning capability of the retaining member 14 is that the alignment section 34 can be used to more easily insert into the aperture 102 of the fastener member 54. The technician operating the tap tool assembly 10 merely places the alignment section 34 into the aperture 102 and can immediately begin rotating the tap 12 in order to clean debris from the internal threads of the aperture 102, thereby cleaning and renewing the internal threads.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the tap tool assembly 10. Accordingly, these terms, as utilized to describe the present invention should be interpreted relative to a vehicle equipped with the tap tool assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A tap tool assembly comprising:
a tap having a thread cutting section and a shaft section, the tap further including a flat surface formed on the shaft section adjacent to one end of the threaded cutting section;
a retaining member fixed to the shaft section of the tap adjacent to the first end of the thread cutting section, the retaining member being installed to the shaft portion in alignment with the flat surface; and
a sleeve having a central bore extending therethrough, a surface of the sleeve that defines the central bore having a shoulder, the sleeve being coupled to the shaft section of the tap for movement between a first position completely covering the thread cutting section and a second position exposing at least a portion of the thread cutting section, the sleeve being biased to move toward the first position.

2. The tap tool assembly according to claim 1, further comprising
a biasing member installed within the central bore of the sleeve between the shoulder and the retaining member, the biasing member biasing the sleeve to move toward the first position.

3. The tap tool assembly according to claim 2, wherein the biasing member is in a compressed state between the shoulder and the retaining member such that with the sleeve in the first position the biasing spring has a first overall length and with the sleeve in the second position the biasing member has a second overall length that is less than the first overall length.

4. The tap tool assembly according to claim 2, wherein the biasing member is a coil spring, and
the tap extends through a central opening defined by the coil spring.

5. The tap tool assembly according to claim 1, wherein the tap rotates relative to the sleeve.

6. The tap tool assembly according to claim 1, wherein the retaining member has a first thickness measured along an axial direction of the tap, and
the flat surface has a length measured along the axial direction of the tap, the length being greater than the first thickness such that the position of the retaining member along the axial direction of the tap is adjustable thereby defining an adjustment mechanism for adjusting the first position of the sleeve relative to the tap.

7. The tap tool assembly according to claim 6, wherein the tap includes an alignment section at a second end of the thread cutting section, the alignment section of the tap is entirely concealed by the sleeve with the retaining member fixed to the shaft portion at a forward position of the flat surface and the sleeve being in the first position, and the alignment section of the tap at least partially extends out from the second end of the sleeve with the retaining member fixed to the shaft portion at a rearward position of the flat surface and the sleeve being in the first position.

8. A tap tool assembly comprising
a tap having a thread cutting section and a shaft section;
a retaining member fixed to the shaft section of the tap adjacent to the first end of the thread cutting section;
a sleeve having a central bore extending therethrough, a surface of the sleeve that defines the central bore having a shoulder, the sleeve being coupled to the shaft section of the tap for movement between a first position completely covering the thread cutting section and a second position exposing at least a portion of the thread cutting section, the sleeve being biased to move toward the first position;
a retaining clip, and
a surface of the sleeve further that defines the central bore includes a circumferentially extending channel that receives the retaining clip.

9. The tap tool assembly according to claim 8, wherein the retaining clip is positioned to limit movement of the sleeve with the sleeve in the first position.

10. The tap tool assembly according to claim 8, wherein the retaining member is located between the retaining clip and the shoulder of the central bore of the sleeve.

11. The tap tool assembly according to claim 8, wherein the retaining member contacts the retaining clip with the sleeve in the first position and is spaced apart from the retaining clip with the sleeve in the second position.

12. The tap tool assembly according to claim 1, further comprising
an end cap that includes an opening and a power tool receiving end, with a free end of the shaft section of the tap being fixedly attached to the end cap within the opening.

13. The tap tool assembly according to claim 1, wherein the sleeve is made of a plastic material.

14. The tap tool assembly according to claim 1, wherein the sleeve is made of a metallic material.

15. The tap tool assembly according to claim 1, wherein the tap includes an alignment section at a second end of the thread cutting section.

16. The tap tool assembly according to claim 15, wherein the alignment section has an outer diameter that is smaller than the thread cutting section.

17. The tap tool assembly according to claim 1, wherein the sleeve has a first end and a second end with the central bore extending from the first end to the second end, such that with the sleeve in the second position the thread cutting section extends out of the central bore at the first end of the sleeve.

18. The tap tool assembly according to claim 17, wherein the first end of the sleeve has an outer surface section with a tapering shape and a remainder of the outer surface of the sleeve has an overall cylindrical shape.

19. The tap tool assembly according to claim 17, wherein at least a portion of the shaft section of the tap extends out of the central bore at the second end of the sleeve with the sleeve in the first position and with the sleeve in the second position.

* * * * *